United States Patent
Thompson

(10) Patent No.: US 7,522,921 B2
(45) Date of Patent: Apr. 21, 2009

(54) SYSTEM FOR SIMULTANEOUS REGISTRATION OF VOIP NETWORK FOR DUAL MODE MOBILE TELEPHONE STATIONS

(75) Inventor: Robin Jeffrey Thompson, Batavia, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 712 days.

(21) Appl. No.: 11/132,476

(22) Filed: May 19, 2005

(65) Prior Publication Data

US 2006/0264213 A1    Nov. 23, 2006

(51) Int. Cl.
H04W 4/00 (2006.01)
H04B 7/00 (2006.01)
(52) U.S. Cl. .................. 455/433; 455/435.1; 455/432.1
(58) Field of Classification Search ................ 455/433, 455/435.1, 435.2, 432.1, 432.3, 550.1, 552.1, 455/553.1, 445, 560; 370/310
See application file for complete search history.

(56) References Cited

U.S. PATENT DOCUMENTS

2004/0162068 A1* 8/2004 Lamb et al. .............. 455/432.1
2006/0087991 A1* 4/2006 Christie ...................... 370/310

* cited by examiner

*Primary Examiner*—Melur Ramakrishnaiah

(57) ABSTRACT

The dual registration system tracks two serving Mobile Switching Centers for each subscriber. The registrations are differentiated as IP Multimedia Subsystem for voice call delivery purposes and CDMA Mobile Switching Center for IP access and other non-voice services. The registration message from the IP Multimedia Subsystem is enhanced via protocol extensions to include an indication that this registration is from the IP Multimedia Subsystem and is to indicate the target Mobile Switching Center for IP Multimedia Subsystem services, such as VoIP. The Home Location Register is enhanced to store two Mobile Switching Centers as the serving Mobile Switching Centers for the dual mode subscriber. The Home Location Register logic is extended to route service to the appropriate Mobile Switching Center depending on service offered, subscriber preferences, and the registration status.

14 Claims, 7 Drawing Sheets

SYSTEM FOR SIMULTANEOUS REGISTRATION OF VOIP NETWORK FOR DUAL MODE MOBILE TELEPHONE STATIONS

FIELD OF THE INVENTION

This invention relates to mobile telephone stations and to the concurrent registration of multiple serving Mobile Switching Centers at the subscriber's Home Location Register for dual mode mobile telephone stations to thereby differentiate between IP Multimedia Subsystem networks for voice call delivery purposes and CDMA Mobile Switching Centers for IP access and other non-voice services.

PROBLEM

It is a problem in the field of mobile telephone networks to implement the registration of mobile telephone station sets at the subscriber's Home Location Register in a manner to support subscribers who are equipped with dual mode mobile telephone stations. As the industry moves toward Voice over IP (VoIP) and IP Multimedia Subsystem (IMS) networks, there is a need to support the subscribers who subscribe to dual VoIP mobile network services as well as legacy circuit mobile network service. Specifically, service providers desire the ability to provide VoIP service using the IP Multimedia Subsystem or similar networks while the subscriber is in a WiFi or similar coverage area. When the subscriber is outside the WiFi or similar IP access network (such as CDMA EV-DO rev A or CDMA 3G-1X Service Option 60), services are provided on the legacy circuit mobile telephone network (such as CDMA). This assumes a handset that operates in either mode as appropriate for the coverage area.

However, to achieve this service objective, the mobile telephone network must have the ability to determine to which network the calls for the subscriber should be directed. This requirement can be addressed by modeling the circuit network mobility schemes defined in ANSI-41 and GSM MAP (Global System for Mobile Communications—Mobile Application Part) and causing the IP Multimedia Subsystem network to emulate a legacy Mobile Switching Center and register with the Home Location Register as the serving system while the subscriber is in the WiFi/VoIP coverage area.

However, when the IP access network that is used to transport the VoIP between the IP Multimedia Subsystem and subscriber equipment is a CDMA packet access service, the subscriber must register (registration 1) at the CDMA Mobile Switching Center to get authorization for the IP access service. This results in a registration with the Home Location Register identifying the CDMA (or GSM/UMTS) Mobile Switching Center as the serving Mobile Switching Center for that subscriber at this time and causes a VLR for that subscriber to be provided at the CDMA Mobile Switching Center. In addition, the subscriber must register with the IP Multimedia Subsystem to receive IP Multimedia Subsystem services such as VoIP (registration 2). The IP Multimedia Subsystem must also register with the Home Location Register as the serving Mobile Switching Center so that the Home Location Register knows how to route calls to the IP Multimedia Subsystem for delivery to the subscriber via the VoIP service. Because the ANSI-41 Home Location Register only views one Mobile Switching Center as the presently serving Mobile Switching Center, the CDMA Mobile Switching Center providing IP access is replaced by the IP Multimedia Subsystem due to the IP Multimedia Subsystem registration 2 as noted above. The Home Location Register causes the registration and the VLR for that subscriber at the CDMA Mobile Switching Center to be deleted. This can cause a problem with the IP access service being offered and may cause that service to be terminated, resulting in the disconnection of the handset from the IP Multimedia Subsystem and prevention of making or receiving voice calls.

When the subscriber roams to another CDMA Mobile Switching Center for IP access and re-registers with that new CDMA Mobile Switching Center, this activity causes a new registration session to be initiated with the Home Location Register (registration 3), and this new registration session results in the registration 2 from the IP Multimedia Subsystem being deleted. As a result, calls are no longer routed to the IP Multimedia Subsystem, and this will definitely result in misdirected calls.

SOLUTION

The above-described problems are solved and a technical advance achieved by the present system for concurrent registration of VoIP network and circuit network serving Mobile Switching Centers for dual mode mobile telephone stations (termed "dual registration system" herein) which tracks multiple serving Mobile Switching Centers for each subscriber. The registrations are differentiated as IP Multimedia Subsystem for voice call delivery purposes and CDMA Mobile Switching Center for IP access and other non-voice services. The registration notification message from the IP Multimedia Subsystem to the mobile subscriber's Home Location Register is enhanced via protocol extensions to include an indication that this registration is from the IP Multimedia Subsystem and is to indicate the identity of the target Mobile Switching Center for IP Multimedia Subsystem services, such as VoIP. The Home Location Register is enhanced to store the identities of two Mobile Switching Centers as the serving Mobile Switching Centers for the dual mode subscriber. The Home Location Register logic is extended to route service to the appropriate Mobile Switching Center depending on subscriber preferences and the registration status.

If the subscriber is dual registered on both a CDMA Mobile Switching Center (normal registration message) and the IP Multimedia Subsystem Mobile Switching Center (registration message with protocol extension to indicate VoIP services), and the subscriber preference is for VoIP service when available, then incoming voice calls to that subscriber result in routing queries and call delivery to the IP Multimedia Subsystem. However, other services, such as Short Message Service (SMS), Location Queries, or Message Waiting Indication (MWI), can result in routing to the CDMA Mobile Switching Center since those can be delivered to the subscriber while the subscriber is on a packet data session.

Because the subscribers are concurrently registered on both the CDMA and IMS networks, subscribers moving out of the IP Multimedia Subsystem network will not normally re-register with the circuit network since the existing circuit network registration is still valid. As a result, the Home Location Register must be notified that the subscriber is no longer active in the IP Multimedia Subsystem via a de-registration event at the IP Multimedia Subsystem.

Only the new dual mode IP Multimedia Subsystem and Home Location Register must support the protocol extension to the registration message, and the legacy systems of the mobile telephone network continue to send the standard registration message. This solution, therefore, has no impact on existing circuit network Mobile Switching Centers.

DETAILED DESCRIPTION OF THE DRAWINGS

IP Multimedia System (IMS)

IP Multimedia Subsystem (IMS), sometimes referred to as MMD (Multi-Media Domain), represents a 3GPP and 3GPP2 effort to define an all-IP-based wireless network as compared to the historically disparate voice, data, signaling, and control network elements. The IP Multimedia Subsystem is an industry standard way of building next-generation networks that deliver rich IP multimedia services to subscribers over wireless and/or wire-line networks. The major IP Multimedia System network elements include:

Access Gateway (AG): This network element provides an interface between the radio network (Access Network) and the IP-based network.

Access Network (AN): This is the radio portion of the network.

Breakout Gateway Control Function (BGCF): Controls resources allocation to IP sessions.

Call Session Control Function (CSCF): Provides control and routing function for IP sessions.

Foreign Agent (FA): Advertises itself to mobile stations in serving area; provides registration information to Home Agent; forwards packets from mobile to Home Agent.

Home Agent (HA): Tracks current Foreign Agent serving the mobile; forwards packets to current FA.

Home Subscriber Server (HSS): Can take the place of a HLR in all-IP network; contains AAA function and other databases.

Media Gateway (MGW): Provides interface for bearer traffic between IP and PSTN.

Media Gateway Control Function (MGCF): Provides signaling interoperability between IP and PSTN domains—SIP to ISUP and vice versa.

Policy Decision Function (PDF): As IP networks, unlike TDM networks, assign network bandwidth and resources in real-time; the role of the PDF is to assign resources according to demand and QoS requirements.

Position Determining Entity (PDE): While some mobiles can determine position independently, the PDE can provide assistance by way of location determination algorithms.

SIP Application Server: Represents a platform for Session Initiation Protocol (SIP) application development and operation.

The IP Multimedia Subsystem is defined by 3GPP and 3GPP2 technical organizations and is a service infrastructure based on the Session Initiation Protocol. The internationally recognized standard defines a generic architecture that will offer VoIP and other multimedia services within wireline and wireless applications. The architecture is divided into three layers:

Gateway,

Session Control, and

Application.

The IP Multimedia Subsystem, which establishes IP connections between various client devices, was developed with two main goals: 1) to support access convergence with 2G, 3G, 4G, and WiFi networks; and 2) to support multimedia convergence of voice, video, messaging, and data.

As noted above, subscribers who access this network must be supported in a manner that is transparent and also satisfies their defined preferences in terms of receipt of incoming calls and other services.

Existing CDMA Mobile Networks

Figure 1:
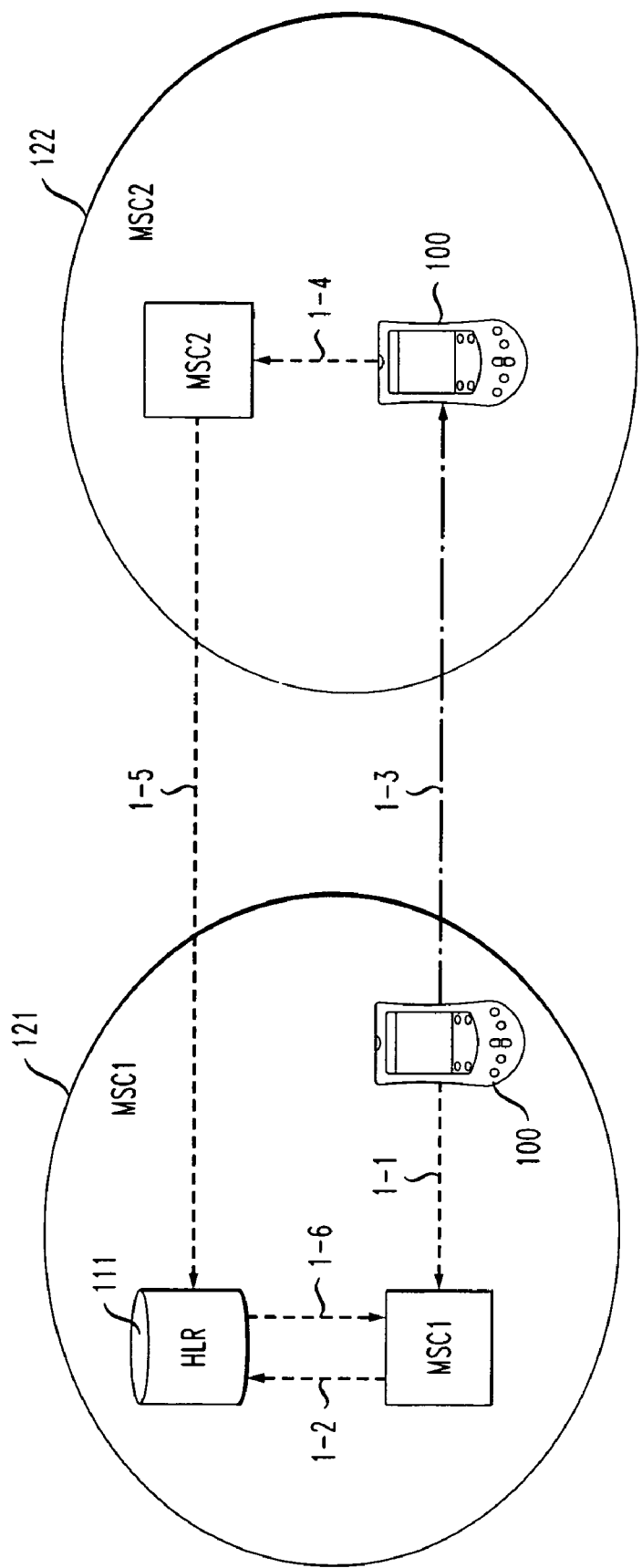
FIGS. 1 and 2 illustrate in message flow and flow chart form, respectively, the operation of an existing CDMA system.
Figure 2:
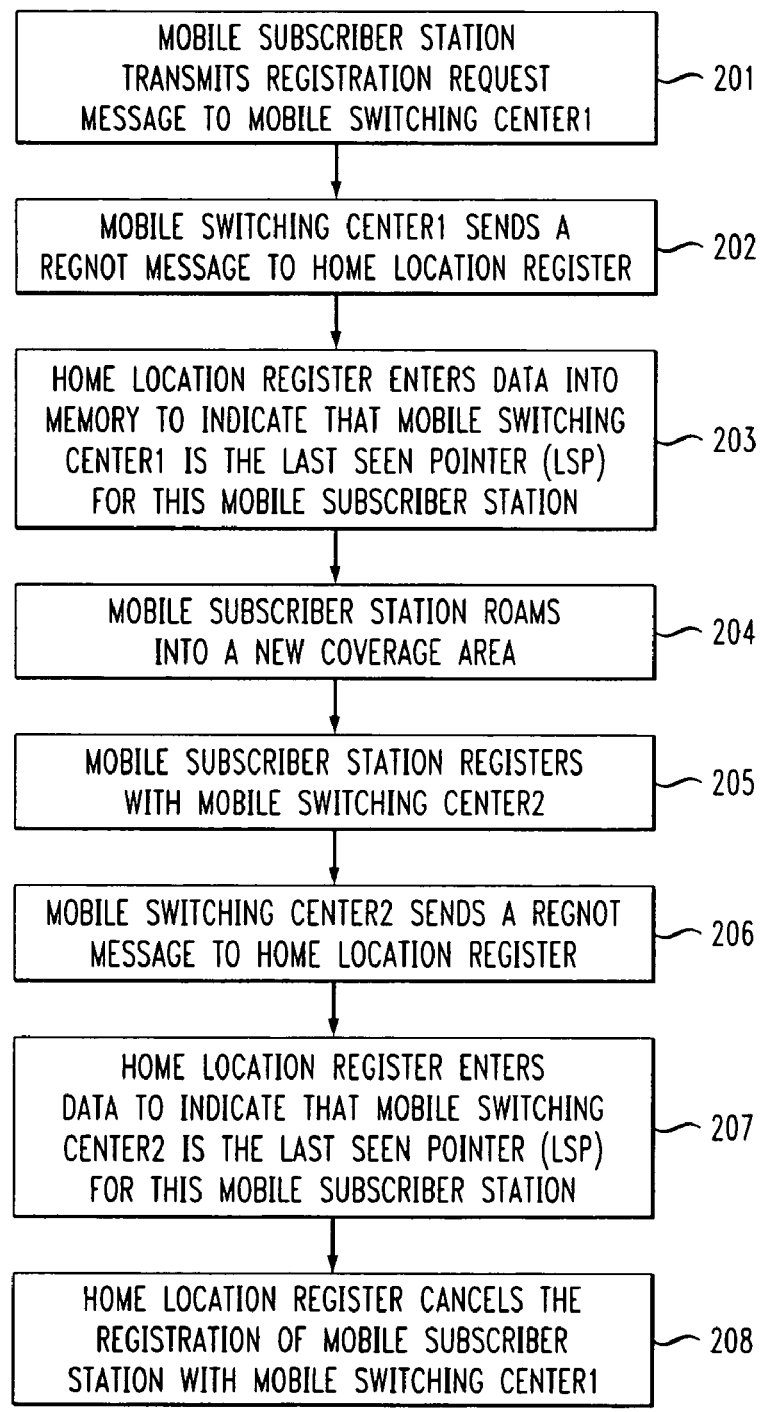

FIGS. 1 and 2 illustrate in message flow and flow chart form, respectively, the operation of an existing CDMA mobile network, which consists of two Mobile Switching Centers—MSC1, MSC2, and the Home Location Register 111. The coverage areas of Mobile Switching Center MSC1 and Mobile Switching Center MSC2 are shown diagrammatically as areas 121, 122. As an example of the operation of this prior art mobile telephone network, a mobile subscriber station 100 is shown as operational in the coverage area of Mobile Switching Center MSC1 and roams into the coverage area of Mobile Switching Center MSC2. Existing single mode mobile subscriber stations use this legacy mobile network as described herein.

The operation of this mobile telephone network is initiated at step 201 in FIG. 2 when the mobile subscriber station 100 (located in coverage area 121) transmits a registration request message to Mobile Switching Center MSC1 via path 1-1. The Mobile Switching Center MSC1, in response to receipt of a registration request, at step 202 sends a Registration Notification (Regnot) message via path 1-2 to Home Location Register 111 in coverage area 121. In response to receipt of this Regnot message from Mobile Switching Center MSC1, Home Location Register 111 at step 203 enters data into memory to indicate that Mobile Switching Center MSC1 is the Last Seen Pointer (LSP) for this mobile subscriber station 100; that is, MSC1 is the serving Mobile Switching Center. At step 204, the mobile subscriber station 100 roams from coverage area 121 to coverage area 122, as shown in FIG. 1 by path 1-3. Since mobile subscriber station 100 has entered a new coverage area, it must register with the Mobile Switching Center that serves this new coverage area. At step 205, the mobile subscriber station 100 registers with Mobile Switching Center MSC2 by transmitting a registration request message to Mobile Switching Center MSC2 via path 1-4. The Mobile Switching Center MSC2, in response to receipt of a registration request, at step 206 sends a Regnot message via path 1-5 to Home Location Register 111. In response to receipt of this Regnot message from Mobile Switching Center MSC2, Home Location Register 111 at step 207 enters data into memory to indicate that Mobile Switching Center MSC2 is the Last Seen Pointer (LSP) for this mobile subscriber station 100; that is, Mobile Switching Center MSC2 is the serving Mobile Switching Center. At step 208, Home Location Register 111 in Mobile Switching Center MSC1 cancels the registration of mobile subscriber station 100 with Mobile Switching Center MSC1, thereby maintaining a single listing of the serving Mobile Switching Center in memory.

This above-described process is the traditional registration scenario that is used in existing mobile networks. As can be seen from this description, the operation of the mobile telephone network is limited to a single serving Mobile Switching Center, since the presumption is that the mobile subscriber station is registered in a single serving Mobile Switching Center.

CDMA System with an IMS System as the Serving Mobile Switching Center

Figure 3:
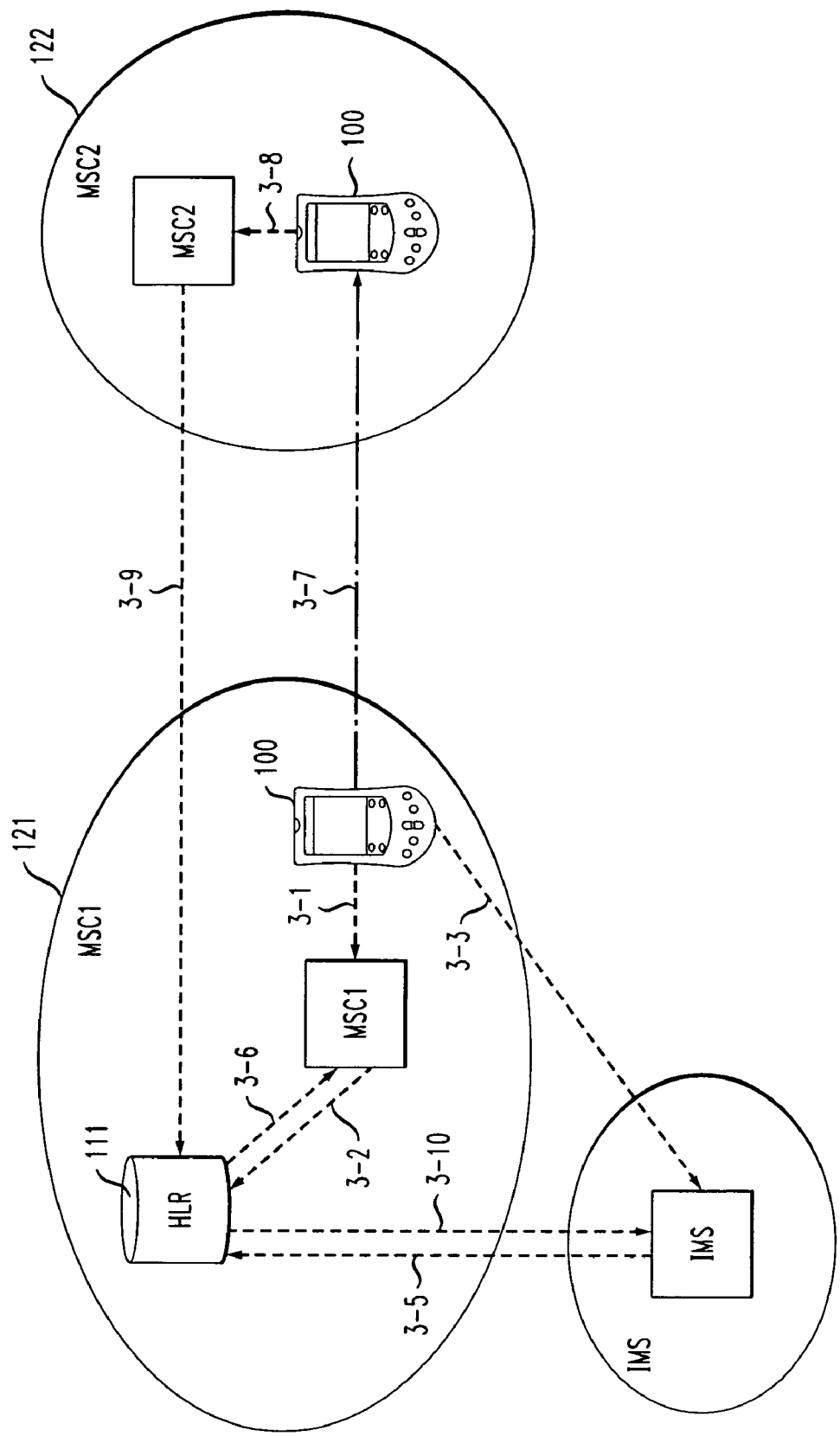
FIGS. 3 and 4 illustrate in message flow and flow chart form, respectively, the operation of an existing CDMA system with an IP Multimedia Subsystem as the serving Mobile Switching Center (this is the problem that is solved)
Figure 4:
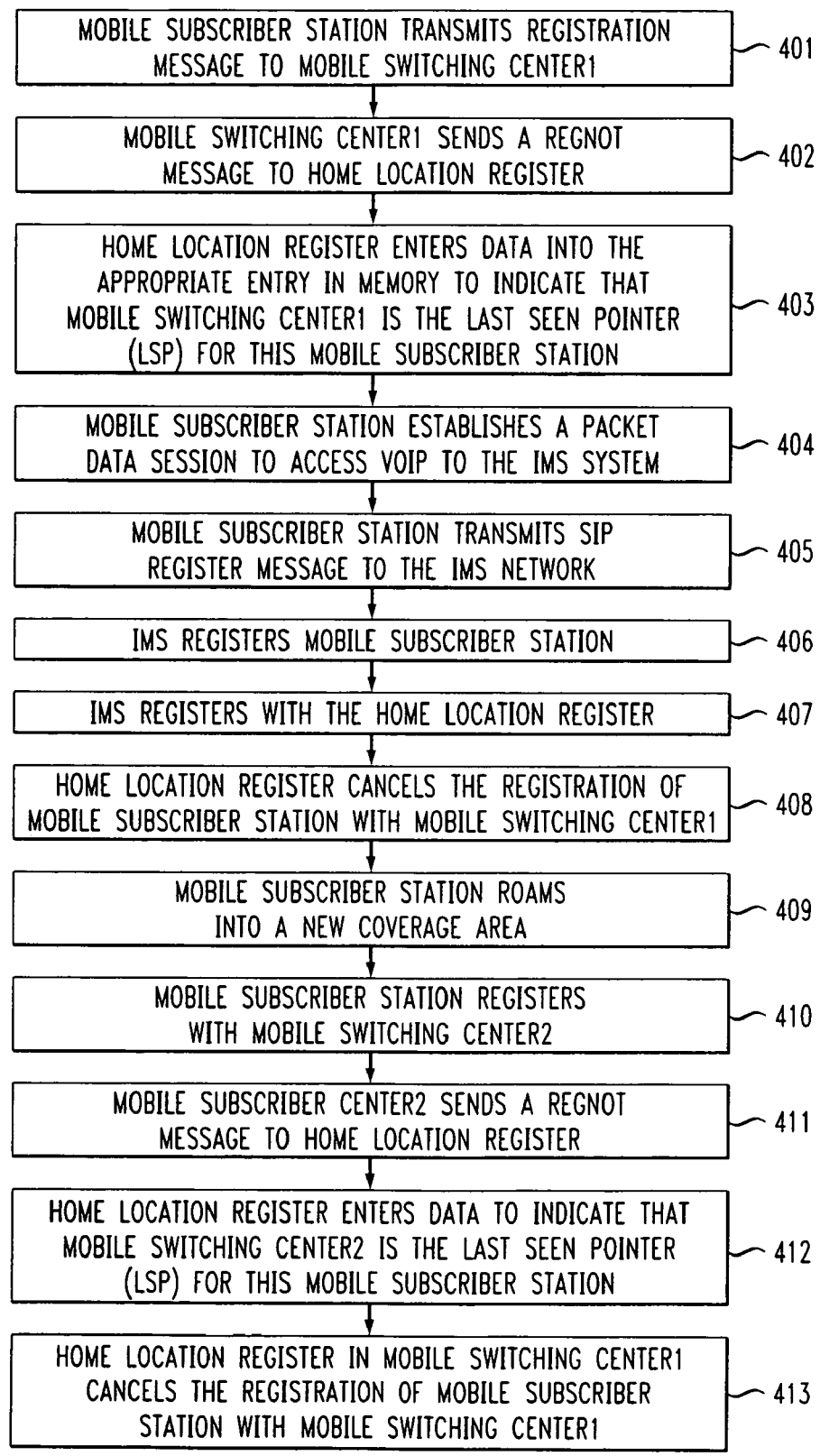

FIGS. 3 and 4 illustrate in message flow and flow chart form, respectively, the operation of an existing CDMA system with an IP Multimedia Subsystem as the serving Mobile Switching Center. This mobile telephone network consists of two Mobile Switching Centers—MSC1, MSC2, and Home Location Register—111. The coverage areas of Mobile Switching Center MSC1 and Mobile Switching Center MSC2 are shown diagrammatically as areas 121, 122. As an example of the operation of this prior art mobile telephone network, a mobile subscriber station 100 is shown as operational in the coverage area of Mobile Switching Center MSC1 and roams into the coverage area of Mobile Switching Center MSC2. In addition, an IP Multimedia Subsystem is shown as operational in this space.

The operation of this mobile telephone network is initiated at step 401 in FIG. 4 when the mobile subscriber station 100 (located in coverage area 121) transmits a registration request message to Mobile Switching Center MSC1 via path 3-1. The Mobile Switching Center MSC1, in response to receipt of a registration request message, at step 402 sends a Regnot message via path 3-2 to Home Location Register 111. In response to receipt of this Regnot message from Mobile Switching Center MSC1, Home Location Register 111 at step 403 enters data into memory to indicate that Mobile Switching Center MSC1 is the Last Seen Pointer (LSP) for this mobile subscriber station 100; that is, Mobile Switching Center MSC1 is the serving Mobile Switching Center. At step 404, the mobile subscriber station 100 establishes a packet data session to access VoIP in the IP Multimedia Subsystem. At step 405, the mobile subscriber station 100 transmits a SIP REGISTER message to the IP Multimedia Subsystem network via path 3-3. In response to receipt of this message, the IP Multimedia Subsystem at step 406 registers the mobile subscriber station 100 with the IP Multimedia Subsystem, which, at step 407, registers with the Home Location Register 111. At step 408, Home Location Register 111 cancels the registration of mobile subscriber station 100 with Mobile Switching Center MSC1, thereby maintaining a single listing of the serving Mobile Switching Center in memory.

At step 409, mobile subscriber station 100 roams from coverage area 121 to coverage area 122, as shown in FIG. 3 by path 3-7. Since mobile subscriber station 100 has entered a new coverage area, it must register with the Mobile Switching Center that serves this new coverage area. At step 410, the mobile subscriber station 100 registers with Mobile Switching Center MSC2 by transmitting a registration request message to Mobile Switching Center MSC2 via path 3-8. The Mobile Switching Center MSC2, in response to receipt of a registration request, at step 411 sends a Regnot message via path 3-9 to Home Location Register 111. In response to receipt of this Regnot message from Mobile Switching Center MSC2, Home Location Register 111 at step 412 enters data into memory to indicate that Mobile Switching Center MSC2 is the Last Seen Pointer (LSP) for this mobile subscriber station 100; that is, Mobile Switching Center MSC2 is the serving Mobile Switching Center. At step 413, Home Location Register 111 cancels the registration of mobile subscriber station 100 with IP Multimedia Subsystem, thereby maintaining a single listing of the serving Mobile Switching Center in memory.

The problem with the above-described operation is that the mobile subscriber station 100 is in the call coverage area of Mobile Switching Center MSC2, but is registered with IP Multimedia Subsystem for VoIP service. If an incoming call is received at this juncture, the Last Seen Pointer in the Home Location Register is set to Mobile Switching Center MSC2, and the incoming call is routed to Mobile Switching Center MSC2, not the IP Multimedia Subsystem as desired by the subscriber. Thus, dual mode mobile subscriber stations do not function as desired when active in the legacy mobile telephone network.

Dual Mode Registration Process

The dual registration system tracks two serving Mobile Switching Centers for each subscriber. The registrations are differentiated as IP Multimedia Subsystem for voice call (or other IP Multimedia Subsystem based service) delivery purposes and CDMA Mobile Switching Center for IP access and other non-IMS services. The registration request message from the IP Multimedia Subsystem is enhanced via protocol extensions to include an indication that this registration is from the IP Multimedia Subsystem and is to indicate the target Mobile Switching Center for IMS services, such as VoIP. The Home Location Register is enhanced to store two Mobile Switching Centers as the serving Mobile Switching Centers for the dual mode subscriber. The Home Location Register logic is extended to route service to the appropriate Mobile Switching Center depending on the service being offered, subscriber preferences, and the registration status.

If the subscriber is dual registered on both a CDMA Mobile Switching Center (normal registration message) and the IP Multimedia Subsystem Mobile Switching Center (registration message with protocol extension to indicate VoIP services), and the subscriber preference is for VoIP service when available, then incoming voice calls to that subscriber will result in routing queries and call delivery to the IP Multimedia Subsystem Mobile Switching Center. However, other services, such as Short Message Service (SMS), Location Queries, or Message Waiting Indication (MWI), can result in routing to the CDMA Mobile Switching Center if those services can be delivered to the subscriber while they are on a packet data session. Because the subscribers are concurrently registered on both the CDMA and IP Multimedia Subsystem networks, subscribers moving out of the IP Multimedia Subsystem network will not normally re-register with the circuit network. As a result, the Home Location Register must be notified that the subscriber is no longer active in the IP Multimedia Subsystem via a de-registration event at the IP Multimedia Subsystem.

Only the new dual mode IP Multimedia Subsystem and Home Location Register must support the protocol extension to the registration message, and the legacy systems continue to send the standard registration message. This solution has no impact on existing circuit network Mobile Switching Centers.

Figure 5:
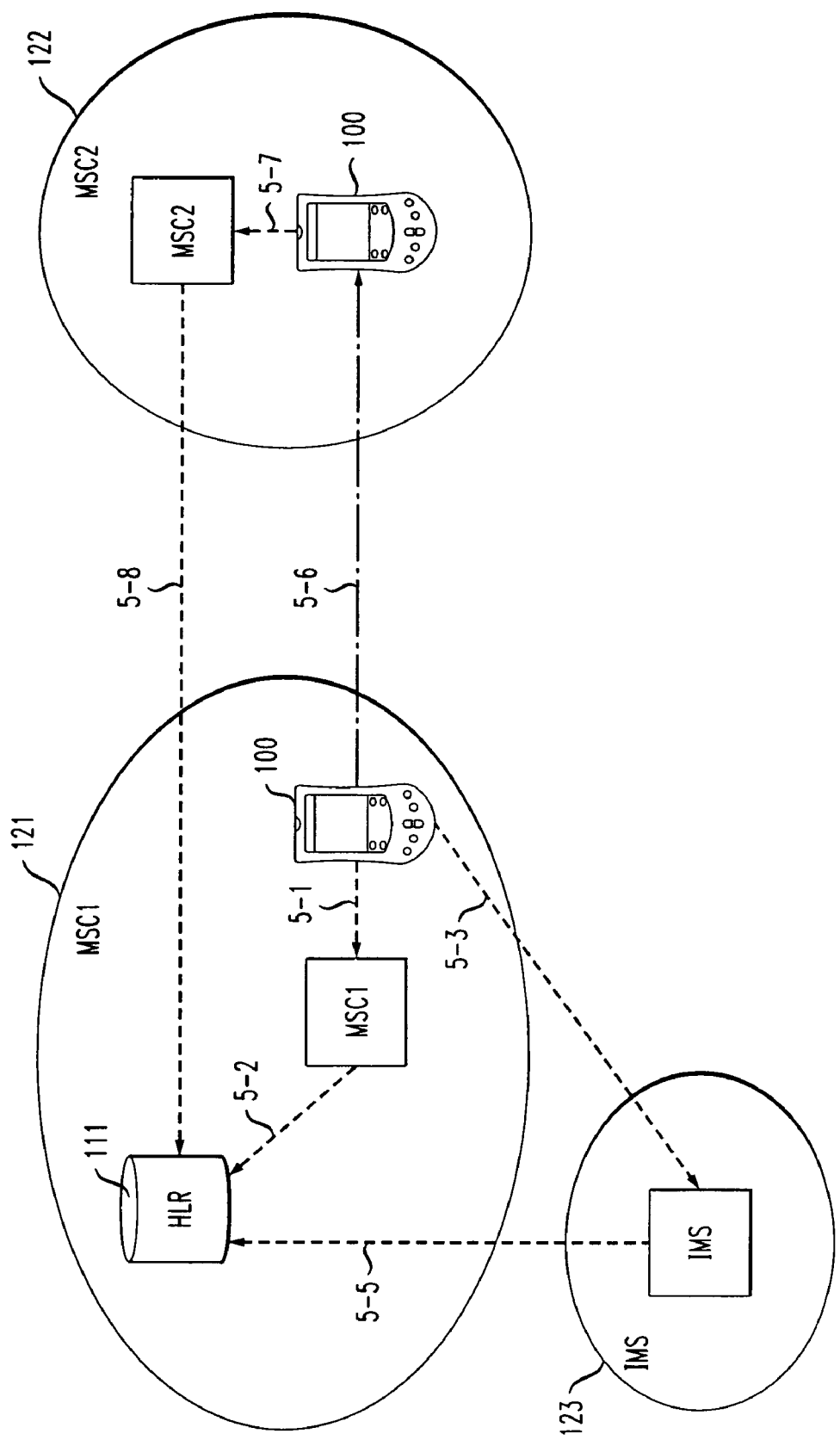
FIGS. 5 and 6 illustrate in message flow and flow chart form, respectively, the operation of the present dual mode registration process in an existing CDMA system with an IP Multimedia Subsystem as the serving Mobile Switching Center.
Figure 6:
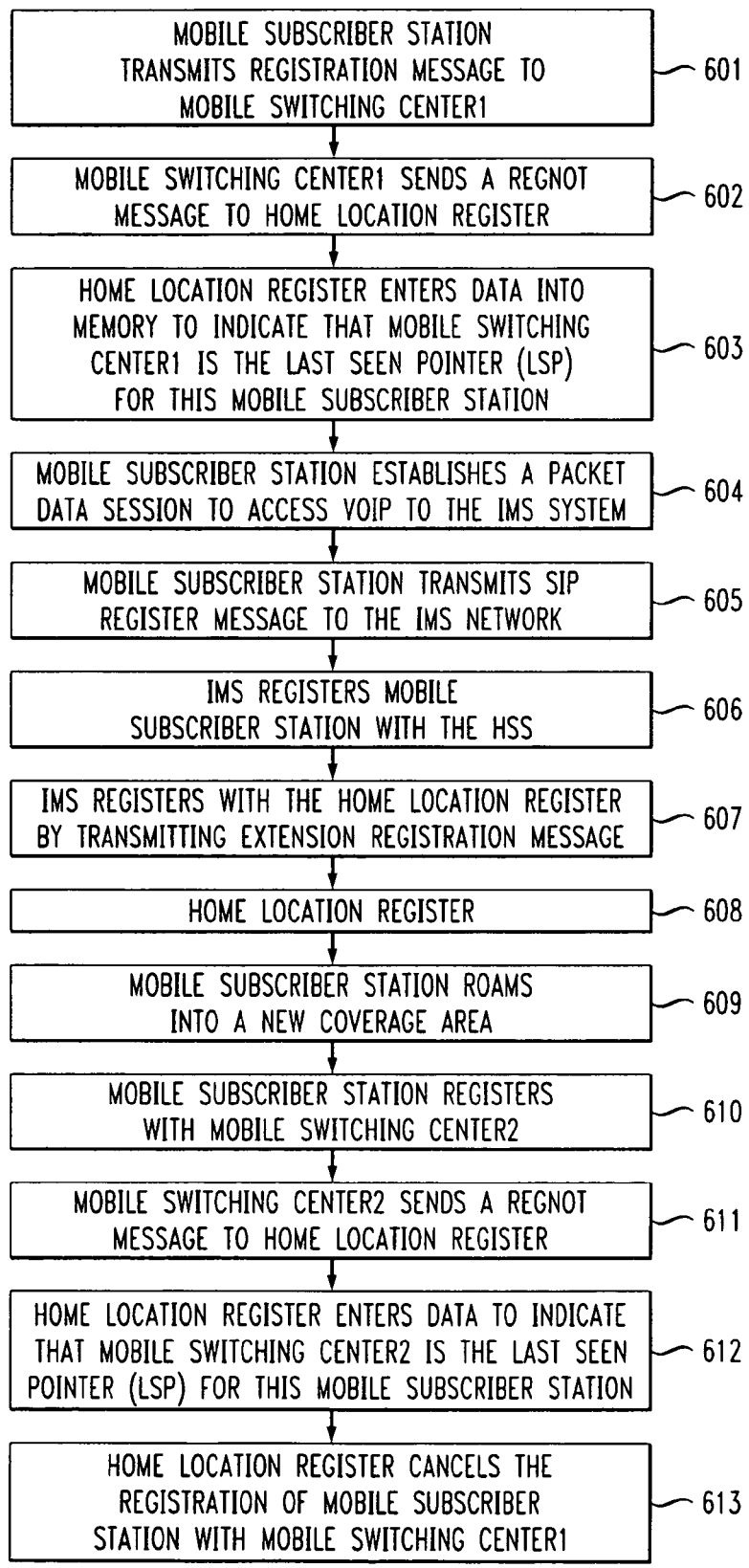

FIGS. 5 and 6 illustrate in message flow and flow chart form, respectively, the operation of the present dual mode registration process in an existing CDMA system with an IP Multimedia Subsystem as the serving Mobile Switching Center. This mobile telephone network consists of two Mobile Switching Centers—MSC1, MSC2, and Home Location Register 111. The coverage areas of Mobile Switching Center MSC1 and Mobile Switching Center MSC2 are shown diagrammatically as areas 121, 122. As an example of the operation of this prior art mobile system, a mobile subscriber station 100 is shown as operational in the coverage area of Mobile Switching Center MSC1 and roams into the coverage area of Mobile Switching Center MSC2. In addition, an IP Multimedia Subsystem system is shown as operational in this space.

The operation of this mobile telephone network is initiated at step 601 in FIG. 6 when the mobile subscriber station 100 (located in coverage area 121) transmits a registration request message to Mobile Switching Center MSC1 via path 5-1. The Mobile Switching Center MSC1, in response to receipt of a registration request, at step 602 sends a Regnot message via path 5-2 to Home Location Register 111. In response to receipt of this Regnot message from Mobile Switching Center MSC1, Home Location Register 111 at step 603 performs normal Mobile Switching Center registration activity and enters data into a first location in memory to indicate that Mobile Switching Center MSC1 is the Last Seen Pointer (LSP) for this mobile subscriber station 100; that is, Mobile Switching Center MSC1 is the serving Mobile Switching Center. At step 604, the mobile subscriber station 100 establishes a packet data session to access VoIP over path 5-3 to the IP Multimedia Subsystem. At step 605, the mobile subscriber station 100 transmits a SIP REGISTER message to the IP Multimedia Subsystem network via path 5-3. In response to receipt of this message, the IP Multimedia Subsystem at step 606 registers the mobile subscriber station 100 with the IP Multimedia Subsystem, which, at step 607, registers with the Home Location Register 111 by transmitting the extension version of the registration message, indicating that the IP Multimedia Subsystem is supporting voice and possibly other services. At step 608, Home Location Register 111 lists in a second location in memory the identity of the serving Mobile Switching Center as IP Multimedia Subsystem with voice service as the IP Last Seen Pointer (LSP). Voice service is used as an example here; clearly, other services included in the Registration Notification by the IP Multimedia Subsystem as supported for this subscriber could also be marked for delivery via IP Multimedia Subsystem Last Seen Pointer (LSP). Normal registration activities such as download of the VLR profile data to the IP Multimedia Subsystem may occur at this point if the VLR profile data is to be used by the IP Multimedia Subsystem.

Thus, upon receipt of an incoming call, the data stored in Home Location Register 111 determines the routing of the call based upon the services provided by the serving IP-based Mobile Switching Center and the serving Mobile Switching Center, respectively. The incoming call is routed to the serving IP-based Mobile Switching Center for the provision of services allocated to that Mobile Switching Center, and the incoming call is routed to the serving Mobile Switching Center for the provision of services not supported by the serving IP-based Mobile Switching Center. The use of the multiple records in the Home Location Register 111 enables the parsing of services among multiple Mobile Switching Centers and the associated routing of the incoming call to the services-appropriate Mobile Switching Center.

At step 609, mobile subscriber station 100 roams from coverage area 121 to coverage area 122, as shown in FIG. 5 by path 5-6. Since mobile subscriber station 100 has entered a new coverage area, it must register with the Mobile Switching Center that serves this new coverage area. At step 610, the mobile subscriber station 100 registers with Mobile Switching Center MSC2 by transmitting a registration request message to Mobile Switching Center MSC2 via path 5-7. The Mobile Switching Center MSC2, in response to receipt of a registration request, at step 611 sends a standard Regnot message via path 5-8 to Home Location Register 111. In response to receipt of this Regnot message from Mobile Switching Center MSC2, Home Location Register 111 at step 612 enters data into the first location in memory to indicate that Mobile Switching Center MSC2 is the non-IP Multimedia Subsystem Last Seen Pointer (LSP) for this mobile subscriber station 100; that is, Mobile Switching Center MSC2 is the serving Mobile Switching Center. At step 613, Home Location Register 111 cancels the registration of mobile subscriber station 100 with Mobile Switching Center MSC1 as listed in the first location in memory, thereby maintaining an accurate listing of the serving Mobile Switching Center in memory.

Dual Mode De-Registration Process

Figure 7:
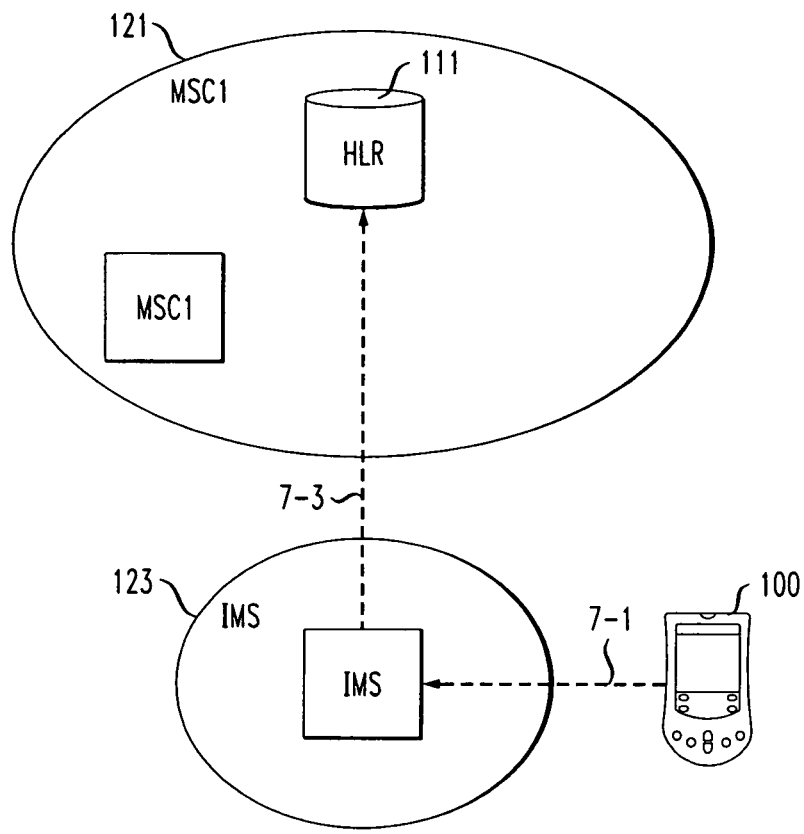
FIGS. 7 and 8 illustrate in message flow and flow chart form, respectively, the operation of the IP Multimedia Subsystem de-registration process with the Home Location Register.
Figure 8:
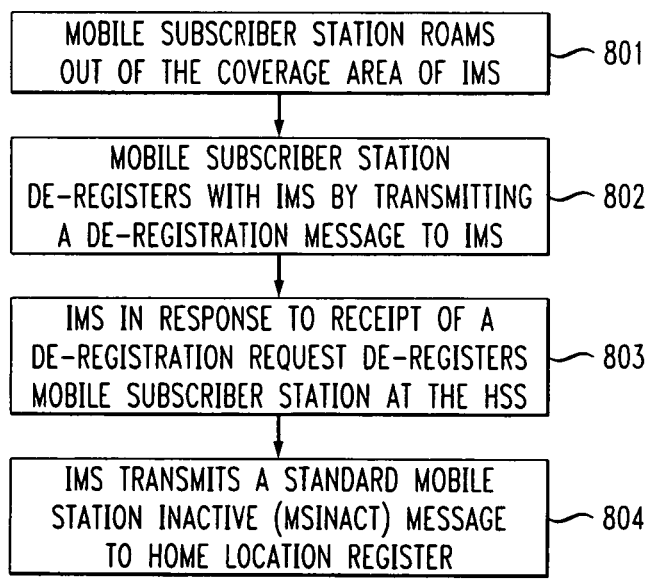

FIGS. 7 and 8 illustrate in message flow and flow chart form, respectively, the operation of the present dual mode de-registration process in an existing CDMA system with an IP Multimedia Subsystem as the serving Mobile Switching Center. In this instance, the mobile subscriber station 100 begins to move out of the coverage area of the IP Multimedia Subsystem and, therefore, must de-register with the IP Multimedia Subsystem. At step 801, the mobile subscriber station 100 roams out of the coverage area of IP Multimedia Subsystem as shown by path 7-1. Since mobile subscriber station 100 is entering a new coverage area, it must de-register with the IP Multimedia Subsystem in the old coverage area. At step 802, the mobile subscriber station 100 de-registers with IP Multimedia Subsystem by transmitting a SIP de-registration message to IP Multimedia Subsystem via path 7-2. The IP Multimedia Subsystem, in response to receipt of a de-registration request, at step 803 de-registers mobile subscriber station 100 at the HSS via path 703 and transmits at step 804 an extended mobile station inactive (MSINACT) message via path 7-6 to Home Location Register 111. The Home Location Register 111 removes the IP Multimedia Subsystem from the IP Multimedia Subsystem Last Seen Pointer memory location, and the mobile is now registered only in the CDMA network.

Summary

The dual registration system tracks two serving Mobile Switching Centers for each subscriber. The registrations are differentiated as IP Multimedia Subsystem for IMS services such as voice call delivery purposes and CDMA Mobile Switching Center for IP access and other non-IMS services. The Registration and MS Inactive messages from the IP Multimedia Subsystem are enhanced via protocol extensions to include an indication that this message is from the IP Multimedia Subsystem and is to indicate the target Mobile Switching Center for IP Multimedia Subsystem services, such as VoIP. The Home Location Register is enhanced to store two Mobile Switching Centers as the serving Mobile Switching Centers for the dual mode subscriber. The Home Location Register logic is extended to route service to the appropriate Mobile Switching Center depending on subscriber preferences and the registration status.

What is claimed:

1. A system for maintaining multiple service registrations for a dual mode mobile subscriber station comprising:

means, responsive to receipt of a registration request from said mobile subscriber station, for registering a serving Mobile Switching Center in a first memory location in a Home Location Register for said mobile subscriber station as the serving apparatus for access for said mobile subscriber station; and means, responsive to receipt of a registration request from said mobile subscriber station for IP access, for registering a serving IP-based Mobile Switching Center in a second memory location in a Home Location Register for said mobile subscriber station as the serving apparatus for IP access for said mobile subscriber station, comprising:

means, responsive to receipt of a request for registration message from the dual mode mobile subscriber station at a serving IP-based Mobile Switching Center, for transmitting enhanced Mobile Switching Center identification information, including an indication that said identification information is for a dual mode mobile subscriber station, to said Home Location Register for said mobile subscriber station, and means, in said Home Location Register for said mobile subscriber station, for storing said identification information in said second memory location in said Home Location Register for said mobile subscriber station.

2. The system for maintaining multiple service registrations for a dual mode mobile subscriber station of claim 1 wherein said means for registering a serving Mobile Switching Center comprises:

means, responsive to receipt of a standard request for registration message from the dual mode mobile subscriber station at a serving Mobile Switching Center, for transmitting Mobile Switching Center identification information to said Home Location Register for said mobile subscriber station; and means, in said Home Location Register for said mobile subscriber station, for storing said identification information in said first memory location in said Home Location Register for said mobile subscriber station.

3. The system for maintaining multiple service registrations for a dual mode mobile subscriber station of claim 2 wherein said means for registering a serving Mobile Switching Center further comprises:

means, in said Home Location Register for said mobile subscriber station and responsive to receipt of Mobile Switching Center identification information indicative that said mobile subscriber station has roamed to a new serving Mobile Switching Center, for storing said identification information in said first memory location in said Home Location Register for said mobile subscriber station to replace data previously stored therein.

4. The system for maintaining multiple service registrations for a dual mode mobile subscriber station of claim 1 wherein said means for transmitting said enhanced Mobile Switching Center identification information comprises:

means for generating said registration message inclusive of protocol extensions to include an indication that this registration is from the IP-based Mobile Switching Center, which is the target Mobile Switching Center for IP-based Mobile Switching Center services.

5. The system for maintaining multiple service registrations for a dual mode mobile subscriber station of claim 1, further comprising:

means, responsive to receipt of a de-registering request message from said mobile subscriber station, for de-registering said dual mode mobile subscriber station at said serving IP-based Mobile Switching Center.

6. The system for maintaining multiple service registrations for a dual mode mobile subscriber station of claim 1, further comprising:

means, located in said serving IP-based Mobile Switching Center and responsive to receipt of a de-registering request message from said mobile subscriber station, for transmitting enhanced Mobile Switching Center identification information, including an indication that said identification information is for a dual mode mobile subscriber station, to said Home Location Register for said mobile subscriber station; and means, in said Home Location Register for said mobile subscriber station, for deleting identification information from said second memory location in said Home Location Register for said mobile subscriber station.

7. The system for maintaining multiple service registrations for a dual mode mobile subscriber station of claim 1, further comprising:

services delivery means for routing services provided by said serving IP-based Mobile Switching Center to said serving IP-based Mobile Switching Center and for routing services not supported by said serving IP-based Mobile Switching Center to said serving Mobile Switching Center.

8. A method for maintaining multiple service registrations for a dual mode mobile subscriber station comprising:

registering, in response to receipt of a registration request from said mobile subscriber station for access, a serving Mobile Switching Center in a first memory location in a Home Location Register for said mobile subscriber station as the serving apparatus for access for said mobile subscriber station; and registering, in response to receipt of a registration request from said mobile subscriber station for IP access, a serving IP-based Mobile Switching Center in a second memory location in a Home Location Register for said mobile subscriber station as the serving apparatus for IP services for said mobile subscriber station, comprising:

transmitting, in response to receipt of a request for registration message from the dual mode mobile subscriber station at a serving IP-based Mobile Switching Center, enhanced Mobile Switching Center identification information, including an indication that said identification information is for a dual mode mobile subscriber station, to said Home Location Register for said mobile subscriber station; and storing, in said Home Location Register for said mobile subscriber station, said identification information in said second memory location in said Home Location Register for said mobile subscriber station.

9. The method for maintaining multiple service registrations for a dual mode mobile subscriber station of claim 8 wherein said step of registering a serving Mobile Switching Center comprises:

transmitting, in response to receipt of a standard request for registration message from the dual mode mobile subscriber station at a serving Mobile Switching Center, Mobile Switching Center identification information to said Home Location Register for said mobile subscriber station; and storing, in said Home Location Register for said mobile subscriber station, said identification information in said first memory location in said Home Location Register for said mobile subscriber station.

10. The method for maintaining multiple service registrations for a dual mode mobile subscriber station of claim 9 wherein said step of registering a serving Mobile Switching Center further comprises:

storing, in said Home Location Register for said mobile subscriber station and responsive to receipt of Mobile Switching Center identification information indicative that said mobile subscriber station has roamed to a new serving Mobile Switching Center, said identification information in said first memory location in said Home Location Register for said mobile subscriber station to replace data previously stored therein.

11. The method for maintaining multiple service registrations for a dual mode mobile subscriber station of claim 8 wherein said step of transmitting said enhanced Mobile Switching Center identification information comprises:

generating said registration message inclusive of protocol extensions to include an indication that this registration is from the IP-based Mobile Switching Center, which is the target Mobile Switching Center for IP-based Mobile Switching Center services.

12. The method for maintaining multiple service registrations for a dual mode mobile subscriber station of claim 8, further comprising:

de-registering, in response to receipt of a de-registering request message from said mobile subscriber station, said dual mode mobile subscriber station at said serving IP-based Mobile Switching Center.

13. The method for maintaining multiple service registrations for a dual mode mobile subscriber station of claim 8, further comprising:

transmitting, from said serving IP-based Mobile Switching Center and in response to receipt of a de-registering request message from said mobile subscriber station, enhanced Mobile Switching Center identification information, including an indication that said identification information is for a dual mode mobile subscriber station, to said Home Location Register for said mobile subscriber station; and deleting, from said Home Location Register for said mobile subscriber station, identification information from said second memory location in said Home Location Register for said mobile subscriber station.

14. The method for maintaining multiple service registrations for a dual mode mobile subscriber station of claim 8, further comprising:

routing services provided by said serving IP-based Mobile Switching Center to said serving IP-based Mobile Switching Center and for routing services not supported by said serving IP-based Mobile Switching Center to said serving Mobile Switching Center.

* * * * *